(12) United States Patent
Lee et al.

(10) Patent No.: US 7,884,150 B2
(45) Date of Patent: Feb. 8, 2011

(54) FLAME RETARDANT THERMOPLASTIC ELASTOMER COMPOSITIONS

(75) Inventors: Biing-Lin Lee, Cranston, RI (US); Darnell C. Worley, II, Uxbridge, MA (US)

(73) Assignee: Teknor Apex Company, Pawtucket, RI (US)

( * ) Notice: Subject to any disclaimer, the term of this patent is extended or adjusted under 35 U.S.C. 154(b) by 582 days.

(21) Appl. No.: 11/893,714

(22) Filed: Aug. 17, 2007

(65) Prior Publication Data

US 2009/0048382 A1 Feb. 19, 2009

(51) Int. Cl.
C08K 3/36 (2006.01)
C09K 21/14 (2006.01)

(52) U.S. Cl. ........................ 524/445; 525/239; 525/240; 525/241; 524/570; 524/577; 524/81

(58) Field of Classification Search ................. 524/445, 524/81, 577, 570; 525/239, 240, 241
See application file for complete search history.

(56) References Cited

U.S. PATENT DOCUMENTS

| | | | |
|---|---|---|---|
| 4,101,498 A | 7/1978 | Snyder | |
| 4,622,350 A | 11/1986 | Icenogle et al. | |
| 4,710,317 A | 12/1987 | Tabata et al. | |
| 4,785,044 A | 11/1988 | Kannankeril | |
| 5,777,031 A | 7/1998 | Djiauw et al. | |
| 6,395,839 B2 | 5/2002 | Valligny et al. | |
| 6,414,070 B1 * | 7/2002 | Kausch et al. | 524/445 |
| 6,599,963 B2 | 7/2003 | Horsey et al. | |
| 6,610,770 B1 | 8/2003 | Ross et al. | |
| 2005/0059754 A1 | 3/2005 | Lunt et al. | |
| 2005/0124709 A1 | 6/2005 | Krueger et al. | |
| 2006/0128870 A1 | 6/2006 | Marx et al. | |

FOREIGN PATENT DOCUMENTS

| | | | |
|---|---|---|---|
| JP | 59-074142 | | 4/1984 |
| JP | 08-073684 | * | 3/1996 |
| JP | 10-279747 | * | 10/1998 |
| JP | 2000-080210 | | 3/2000 |
| JP | 2001-270967 | | 10/2001 |
| JP | 2004-018300 | | 1/2004 |
| WO | WO 02/094920 | | 11/2002 |
| WO | WO 2006/071833 | | 7/2006 |

* cited by examiner

Primary Examiner—Robert D. Harlan
(74) Attorney, Agent, or Firm—Hudak, Shunk & Farine Co. LPA

(57) ABSTRACT

Flame retardant polymeric blend compositions including a synergistic combination of flame retardants, including a halogenated flame retardant and a nanoparticulate, such as an organically modified clay or a natural nanoclay. The compositions are thermoplastic elastomers, include a polyolefin and a styrenic block copolymer, and exhibit high char formation upon burning as well as desirable vertical burn characteristics. In a preferred embodiment, the flame retardants include at least a halogenated flame retardant and a metal oxide.

30 Claims, No Drawings

FLAME RETARDANT THERMOPLASTIC ELASTOMER COMPOSITIONS

FIELD OF THE INVENTION

The present invention relates to flame retardant polymeric blend compositions including a synergistic combination of flame retardants, including a halogenated flame retardant and a nanoparticulate, such as an organically modified clay or a natural nanoclay. The compositions are thermoplastic elastomers, include a polyolefin and a styrenic block copolymer, and exhibit high char formation upon burning as well as desirable vertical burn characteristics. In a preferred embodiment, the flame retardants include at least a halogenated flame retardant and a metal oxide.

BACKGROUND OF THE INVENTION

Polyolefin resins are known in the art as having desirable qualities such as ease of processability, chemical resistance, weather resistance, and insulating characteristics. Polyolefins have been utilized very often in various fields.

However, polyolefin resins have also been known to include drawbacks inasmuch as they are generally readily combustible, and when burned, can liquefy due to thermal decomposition, whereby polyolefins can drip the ignited or non-ignited droplets. The presence or absence of a drip is one of the important factors in evaluating flame retardant properties of resins. If dripping is present upon burning, flame retardant properties are considered low, even when self-extinguishing properties are present. It is desirable to reduce dripping and provide compositions with high char formation upon burning. Various approaches have been taken in the prior art in order to render polyolefins more resistant to burning. Flame retardant materials such as halogenated additives, chemical char producers, and chemical water generators have been added to polyolefin compositions.

U.S. Pat. No. 4,101,498 relates to a reportedly oil-resistant, fire-resistant polymer composition which is reportedly useful in coating electrical conductors. The composition comprises a block copolymer, extending oil, polymeric alpha-olefin, filler and fire retardant package comprising antimony trioxide, an adduct of hexachlorocyclo-pentadiene and a zinc borate.

U.S. Pat. No. 4,622,350 relates to a resin composition comprising polypropylene, a hydrogenated mono alkylarene-conjugated diene block copolymer, a functionalized low molecular weight polypropylene wax, oil, and a hydrated organic filler which reportedly can be blended to form a self-extinguishing, low smoke and halogen free insulation composition which exhibits high ultimate elongation and reportedly is relatively easy to process.

U.S. Pat. No. 4,710,317 relates to a reportedly flame retardant polyolefin resin composition which, when molded, reportedly affords a molded product having highly flame retardant properties, no dripping properties, a smooth surface and an excellent appearance and superior resistances to heavy metal deterioration, heat deterioration and weather, which composition consists of (A) 5-60% by weight of a halogen-containing flame retardant, (B) 100-10% by weight of antimony trioxide based on the weight of the halogen-containing flame retardant, (C) 0.5-15% by weight of a crosslinking agent, (D) 0.05-5% by weight of a specified thiophosphite, and (E) the balance % by weight of a polyolefin resin, the total of the quantities (A), (B), (C), (D) and (E) being 100% by weight. If necessary, a processing aid may be further added to the above flame retardant polyolefin resin composition.

U.S. Pat. No. 5,777,031 relates to a thermoplastic elastomer composition comprising a block copolymer having at least two resinous end blocks and a high 1.2-addition butadiene midblock, a paraffin oil and a crystalline polyolefin. The composition reportedly exhibits greater softness, better processability and better elastic properties as compared with similar compositions made with normal amounts of a 1.2-addition. Compositions are reportedly useful for utilities such as overmolding into hard substrates, grips, medical tubing and miscellaneous rubbery articles.

U.S. Pat. No. 6,395,839 relates to a bulk polymerized grafted and crosslinkable thermoplastic polyolefin powder composition which is in the form of a powder intended for the production of flexible coatings by free flow over a hot mold, characterized in that it contains: (a) from 100 to 5% by weight and preferably from 80 to 20% by weight of at least one homopolymer of ethylene and/or at least one copolymer containing at least 50 molar % of ethylene; (b) from 0 to 95% by weight and preferably from 20 to 80% by weight of at least one thermoplastic elastomer; and from 0.1 to 15 parts by weight and preferably from 0.5 to 10 parts by weight of a grafting agent, per 100 parts by weight of the accumulated components "a" and "b". This powder composition reportedly is suitable for the production of flexible coatings by its free flow over a hot mold.

U.S. Pat. No. 6,414,070 relates to nanocomposite compositions comprising organically modified clays and polyolefins or copolymers containing repeat units derived from olefins reportedly having flame retardant or flame resistant properties. Sheets and laminates of the nanocomposite reportedly can be utilized wherever flame retardant properties are desired.

U.S. Pat. No. 6,599,963 relates to a method of reportedly flame retarding a polymeric substrate by adding thereto an effective flame retarding amount of a selected hindered amine compound; and a method of reportedly flame retarding a polymeric substrate by adding thereto an effective flame retarding amount of a synergistic mixture of a selected hindered amine compound and an organic or inorganic flame retardant which contains bromine and/or phosphorus moieties.

U.S. Pat. No. 6,610,770 relates to polymer compositions having flame retardant properties that are made from a polymer blend using a defined process with a smectite clay that has been reacted with a specified mixture of organic materials. These compositions have the property that when the organically modified clay is added to the polymer, a composite results which reportedly has flame-retardant properties.

U.S. Application Publication No. 2006/0128870 relates to compositions comprising a polymeric matrix; a plurality of fillers; and a block copolymer wherein at least one segment of the block copolymer interacts with the fillers. It also relates to compositions comprising a plurality of fillers having surfaces and a block copolymer wherein at least one segment of the block copolymer is reportedly capable of interacting with the fillers upon application in a polymeric matrix. Compositions comprising a flame retardant compound and a block copolymer wherein at least one segment of the block copolymer is reportedly capable of interacting with the flame retardant compound upon application in a polymer matrix are also provided.

International Publication No. WO 02/094920 relates to a nanocomposite composition of from 1 to 30 weight percent hydrogenated C9 aromatic polymer, from 1 to 30 weight percent cation exchanging layered silicate material, and from 98 to 40 weight percent polyolefin, the hydrogenated C9 aromatic polymer and the cation exchanging layered silicate material being dispersed in the polyolefin polymer. It also relates to a method for making such nanocomposition by blending the hydrogenated C9 aromatic polymer, the cation exchanging layered silicate material and the polyolefin at a temperature sufficiently high to melt or soften the polyolefin polymer.

International Publication No. WO 2006/071833 relates to a blend of nanocomposites with a polyolefin nanocomposite preferably serving as a continuous phase and a polyamide nanocomposite preferably serving as a discontinuous phase. The exfoliated nanoclay in both nanocomposites reportedly contributes stiffness, toughness and flame retardancy to the blend. Other optional ingredients include conventional essentially halogen-free flame retardants, intumescent essentially halogen-free flame retardants, and other typical polymer compounding additives. The compound reportedly can be processed as a thermoplastic.

Japanese Publication No. 59-074142 relates to a flame retardant resin composition reportedly having a dripping inhibiting property during combustion, consisting of polypropylene, an inorganic filler, an organic halide flame retarder, a styrene/butadiene rubber and a specified glow time shortening agent.

Japanese Publication No. 08-073684 involves obtaining a composition reportedly suitable for a household appliance and an office automation device material, comprising a styrenic resin, a specific bromine-based flame-retardant, antimony trioxide and a styrene-butadiene copolymer.

Japanese Publication No. 10-279747 relates to a composition reportedly capable of stopping slippage of molding material by fusing to polyolefin molding material which is liable to slip by adding a mineral oil and polypropylene to a styrene-based block copolymer elastomer.

Japanese Publication No. 2000-080210 relates to a halogen-free elastomer composition reportedly having flexibility and elasticity while maintaining heat resistance and abrasion resistance of a composition containing an olefin-based elastomer and a flame retardant suitable for a part material of a wire harness, etc.

Japanese Publication No. 2001-270967 relates to an olefin elastomer composition that reportedly has flame resistance equal to that of polyvinyl chloride and can reportedly satisfy requirements on abrasion resistance as a protective tube or sheet for a wiring harness of a vehicle.

Japanese Publication No. 2004-018300 relates to a reportedly fire-resistant optical fiber core wire which reportedly has excellent mechanical characteristics and fire-resistance and can be used at a high temperature and under high humidity and reportedly where there is very little protruding of an optical fiber at the time of practical use.

SUMMARY OF THE INVENTION

It is an object of the present invention to provide flame retardant compositions that exhibit desirable vertical burn characteristics, preferably greater than characteristics exhibited by polyolefins incorporating one or more flame retardants.

A further object of the present invention is to provide thermoplastic elastomer compositions that exhibit high char formation upon burning.

Another object of the invention is to provide thermoplastic elastomer compositions having a synergistic combination of flame retardants and a nanoparticulate, such as various clays that exfoliate into nano-size particles, preferably an organically modified clay; or a nanoclay in combination with an intercalating additive.

Still another object is to provide a composition comprising a blend of a polyolefin, a styrenic block copolymer, flame retardants and a nanoparticulate preferably organically modified clay that exhibits desirable flame retardant properties while maintaining processability.

Yet another object of the invention is to provide thermoplastic elastomer compositions which, when burned, pass the UL 94 V-0 burn test, and thus form substantially charred compositions.

Another object of the invention is to provide thermoplastic elastomer compositions that can be utilized as jacketing compounds for wire and cable, and can be injection molded for use in electronic parts.

In one aspect of the invention, a flame retardant composition is disclosed, comprising a styrenic block copolymer, wherein the styrenic block copolymer has at least one hard polymer block derived from at least an aromatic vinyl compound unit and at least one soft polymer block, wherein the soft polymer block includes at least one repeat unit derived from an olefin or a diene; a polyolefin polymer or copolymer in an amount from about 30 to about 210 parts based on 100 parts by weight of the styrenic block copolymer; a softener in an amount from about 10 to about 250 parts by weight per 100 parts by weight of the styrenic block copolymer; two or more flame retardants including a halogenated flame retardant in an amount from about 10 to about 250 parts, based on 100 total parts by weight of the polyolefin polymer or copolymer, styrenic block copolymer and softener; and a nanoparticulate comprising one or more of an organically modified clay and a nanoclay in an amount from about 0.5 to about 30 parts, based on 100 total parts by weight of the polyolefin polymer or copolymer, styrenic block copolymer and softener.

In another aspect of the invention, a flame retardant composition is disclosed comprising a styrenic block copolymer, wherein the styrenic block copolymer has at least one hard polymer block derived from at least an aromatic vinyl compound unit and at least one soft polymer block, wherein the soft polymer block includes at least one repeat unit derived from an olefin or a diene; a polyolefin polymer or copolymer in an amount from about 30 to about 210 parts based on 100 parts by weight of the styrenic block copolymer; a softener in an amount from about 10 to about 250 parts by weight per 100 parts by weight of the styrenic block copolymer; three or more flame retardants including (a) a halogenated flame retardant in an amount from about 10 to about 250 parts based on 100 total parts by weight of the polyolefin polymer or copolymer, styrenic block copolymer and softener, (b) a metal oxide flame retardant in an amount from about 5 to about 100 parts based on 100 parts by weight of the halogenated flame retardant, and (c) a zinc-based flame retardant compound is present in an amount from about 10 to about 30 parts based on 100 parts by weight of the halogenated flame retardant; and a nanoparticulate in an amount from about 0.5 to about 30 parts based on 100 total parts by weight of the styrenic block copolymer, polyolefin and softener.

DETAILED DESCRIPTION OF THE INVENTION

The present invention relates to compositions exhibiting desirable flame retardant qualities such as high char formation upon burning and desirable vertical burn rates. The compositions can be processed using extrusion, injection molding or compression molding. The compositions preferably include a polyolefin, a styrenic block copolymer, a combination of flame retardants, and a nanoparticulate preferably an organically modified clay.

Polyolefins

Polyolefins suitable for use in the compositions of the present invention comprise amorphous or crystalline homopolymers or copolymers of two or more different monomers derived from alpha-monoolefins having from 2 to about 12 carbon atoms, and preferably from 2 to about 8 carbon atoms. Examples of suitable olefins include ethylene, propylene, 1-butene, 1-pentene, 1-hexene, 2-methyl-1-propene, 3-methyl-1-pentene, 4-methyl-1-pentene, 5-methyl-1-hexene, and combinations thereof. Polyolefins include, but are not limited to, low density polyethylene, high-density polyethylene, linear-low-density polyethylene, polypropylene (isotactic and syndiotactic), ethylene/propylene copolymers, and polybutene, and olefinic block copolymers. Polyolefin copolymers can also include the greater part by weight of one or more olefin monomers and a lesser amount of one or more non-olefin monomers such as vinyl monomers including vinyl acetate, or a diene monomer, EPDM, etc. Generally, a polyolefin copolymer includes less than about 20 weight percent of a non-olefin monomer, desirably less than 10 weight percent, and preferably less than about 5 weight percent of a non-olefin monomer.

In a further embodiment, the polyolefin can include at least one functional group per chain or can be a blend of non-functionalized polyolefins and functionalized polyolefins. Functional groups can be incorporated into the polyolefin by the inclusion of for example, one or more non-olefin monomers during polymerization of the polyolefin. Examples of functional groups include, but are not limited to, anhydride groups such as maleic anhydride, itaconic anhydride and citraconic anhydride, acrylates such as glycidyl methacrylate, acid groups such as fumaric acid, itaconic acid, citraconic acid and acrylic acid, epoxy functional groups, and amine functional groups. Functional group-containing polyolefins and methods for forming the same are well known to those of ordinary skill in the art. Functionalized polyolefins are available commercially from sources such as Uniroyal, Atofina, and DuPont. Epoxy modified polyethylenes are available from Atofina as LOTADER®. Acid modified polyethylenes are available from DuPont as FUSABOND®.

Polyolefins utilized in the present invention are chosen so as to have sufficient ability to flow under pressure and can relatively easily form intended articles in the molten state, but also allow the final composition to have sufficient mechanical strength and allow for desirable flame retardant properties. Accordingly, the melt flow index of the polyolefins is generally greater than about 0.4, desirably from about 0.4 to about 40, and preferably from about 0.4 to about 20 as measured by ASTM D1238.

Of the olefinic polymers, polypropylene is preferred at least in part due to ease of molding and processability, resistance to chemicals and cost, and imparting mechanical properties.

Polyolefin polymers and copolymers are commercially available from sources including, but not limited to, Chevron, Dow Chemical, DuPont, Exxon Mobil, Huntsman Polymers, Ticona and Westlake Polymer under various designations.

The amount of the polyolefin polymer or copolymer that can be utilized in the compositions of the present invention ranges in an amount generally from about 30 to about 210 parts, desirably from about 60 to about 180 parts, and preferably from about 80 to about 160 parts, based on 100 parts by weight of the styrenic block copolymer.

Styrenic Block Copolymers

The compositions of the present invention include a styrenic block copolymer having a hard block (A) including aromatic vinyl repeat units and at least one soft polymer block (B) including two or more repeat units, that are the same or different, independently derived from one or more of an olefin monomer and a diene monomer. The styrenic block copolymer is preferably hydrogenated. The styrenic block copolymer can be a diblock copolymer (A-B) having a hard polymer block (A) and a soft block (B); a triblock copolymer (A-B-A or B-A-B); or a tetrablock or higher multiblock copolymer. Multiblock copolymers can have arrangements that are linear, branched, or star formation, for example. In a preferred embodiment, the styrenic block copolymer is a triblock copolymer (A-B-A) having two hard blocks or a higher multiblock copolymer.

Each hard polymer block (A) can have one or more, preferably two or more same or different aromatic vinyl repeat units. For example, the block copolymer may contain (A) blocks which are styrene/alpha-methylstyrene copolymer blocks or styrene/butadiene random or tapered copolymer blocks so long as a majority of the repeat units of each hard block are aromatic vinyl repeat units. The (A) blocks are preferably aromatic vinyl compound homopolymer blocks. The term "aromatic vinyl" is to include those of the benzene series, such as styrene and its analogs and homologs including o-methylstyrene, p-methylstyrene, p-tert-butylstyrene, 1,3-dimethylstyrene, alpha-methylstyrene and other ring alkylated styrenes, particularly ring-methylated styrenes, and other monoalkenyl polycyclic aromatic compounds such as vinyl naphthalene, vinyl anthracene and the like. The preferred aromatic vinyl compounds are monovinyl monocyclic aromatics, such as styrene and alpha-methylstyrene, with styrene being most preferred. When three or more different repeat units are present in hard polymer block (A), the units can be combined in any form, such as random form, block form and tapered form.

Optionally, the hard polymer block (A) can comprise small amounts of structural units derived from other copolymerizable monomers in addition to the structural units derived from the aromatic vinyl compounds. The proportion of the structural units derived from other copolymerizable monomers is desirably 30% by weight or less and preferably 10% by weight or less based on the total weight of the hard polymer (A). Examples of other copolymerizable monomers include, but are not limited to, methacrylic ester, acrylic ester, 1-butene, pentene, hexene, conjugated dienes such as butadiene or isoprene, methyl vinyl ether, and other monomers.

The soft polymer block (B) of the styrenic block copolymer comprises one or more or preferably two or more, same or different, structural units. Soft polymer block (B) can be derived from monomer units from one or more of a conjugated diene monomer and an olefin monomer. The olefin monomers generally have from 2 to about 12 carbon atoms and include, for example, ethylene, propylene, butylene, etc. The conjugated diene monomers preferably contain from 4 to about 8 carbon atoms with examples including, but not limited to, 1,3-butadiene (butadiene), 2-methyl-1,3-butadiene (isoprene), 2,3-dimethyl-1,3-butadiene, 1,3-pentadiene (piperylene), 1,3-hexadiene, and the like. When the soft polymer block (B) has structural units derived from three or more repeat units, the structural units may be combined in any form such as random, tapered, block or any combination thereof.

The styrenic block copolymers may be prepared using free-radical, cationic and anionic initiators, or polymerization catalysts. Such polymers may be prepared utilizing bulk, solution or emulsion techniques as known in the art.

In a preferred embodiment, part or all unsaturated double bonds in the soft polymer block (B) of the styrenic block copolymer and/or in hard polymer block (A) if present, are hydrogenated. The hydrogenation ratio is generally 60% by mole or more, desirably 80% by mole or more, and preferably 100% by mole. In general, the hydrogenation or selective hydrogenation of the styrenic block copolymer may be accomplished using any of the numerous hydrogenation processes known to those of ordinary skill in the art.

Optionally, the soft polymer block (B) can include small amounts of structural units derived from other copolymerizable monomers in addition to the structural units described. In this case, the proportion of the other copolymerizable monomers is generally 30% by weight or less, and preferably 10 percent by weight or less based on the total weight of the soft polymer block (B) of the styrenic block copolymer. Examples of other copolymerizable monomers include, for example, styrene, p-methylstyrene, α-methylstyrene, and other monomers that can undergo ionic polymerization.

Optionally, the styrenic block copolymer can be a functionalized styrenic block copolymer such as an acid or anhydride functionalized block copolymer, such as prepared by graft reacting and acid moiety or its derivative into the styrenic block copolymer via a free radically initiated reaction. Examples of suitable monomers which may be grafted include unsaturated mono and polycarboxylic acids and anhydrides containing from about 3 to about 10 carbon atoms. Examples of such monomers are fumaric acid, itaconic acid, citraconic acid, acrylic acid, maleic anhydride, itaconic anhydride, and citraconic anhydride, or the like. Suitable functionalized styrenic block copolymers generally contain from about 0.1 to about 10 percent by weight, preferably from about 0.2 to about 5 percent by weight of the grafted monomer, based on the total weight of the styrenic block copolymer. Grafting reactions can be carried out in solution or by melt mixing the base block copolymer and the acid/anhydride monomer in the presence of a free radical initiator, such as known in the art, see for example U.S. Pat. No. 6,653,408, herein fully incorporated by reference. Suitable functionalized block copolymers are available from KRATON Polymers, Kuraray, Asahi-Kasei, BASF and the like.

An example of an additional functionalized styrenic block copolymer is a styrenic block copolymer having a reactive or crosslinkable hard block including aromatic vinyl repeat units and also preferably a crosslinkable soft block. The hard block generally has at least one of an alkylstyrene-derived functional group or structural unit having at least one alkyl group containing 1 to 8 carbon atoms combined with the benzene ring, and/or an aromatic vinyl monomer unit having a functional group, and at least one soft polymer block comprising two or more repeat units, that are the same or different, derived from one or more monomers, such as an olefin monomer, preferably having from 2 to about 12 carbon atoms, such as ethylene, propylene or butylene, or a diene, such as butadiene or isoprene, or a combination thereof. Such styrenic block copolymers are described in U.S. Pat. No. 7,074,855, herein fully incorporated by reference. A suitable hard block crosslinkable styrenic block copolymer is commercially available from Kuraray Co., Ltd. of Tokyo, Japan as SEPTON® V.

In a preferred embodiment, styrenic block copolymers are styrene-ethylene/butylene-styrene, styrene-butadiene-styrene, styrene-ethylene/propylene-styrene, styrene-isoprene-styrene block copolymers, such as known in the art as SEBS and SEPS block copolymers. Styrenic block copolymers are available in the art from sources such as Kraton Polymers of Houston, Tex. A suitable styrenic block copolymer is available from Kraton Polymers under the Trade Name KRATON® G1651H, which is a linear copolymer based on styrene and ethylene/butylene with a polystyrene content about 30%. Additional styrenic block copolymers are available from Kuraray Co. Ltd. of Tokyo, Japan as SEPTON® 4055 and SEEPS.

Softeners

Compositions of the present invention include a softener such as a mineral oil softener, or synthetic resin softener, a plasticizer, or combinations thereof. The softener can beneficially reduce the temperatures at which the compositions are processable. Oil softeners are generally mixes of aromatic hydrocarbons, naphthene hydrocarbons and paraffin, i.e., aliphatic, hydrocarbons. Those in which carbon atoms constituting paraffin hydrocarbons occupy 50% by number or more of the total carbon atoms are called "paraffin oils". Those in which carbon atoms constituting naphthene hydrocarbons occupy 30 to 45% by number of the total carbon atoms are called "naphthene oils", and those in which carbon atoms constituting aromatic hydrocarbons occupy 35% by number or more of the total carbon atoms are called "aromatic oils". In one embodiment, paraffin oils and/or plasticizers are preferably utilized as a softener in compositions of the present invention. Examples of synthetic resin softeners include, but are not limited to, polyisobutylene, polybutenes and low molecular weight polybutadienes. The softener is present in an amount generally from about 10 to about 250 parts by weight, desirably about 50 to about 150 parts by weight, and preferably from about 65 to 130 parts by weight per 100 parts by weight of the styrenic block copolymer.

Flame Retardants

The compositions of the present invention include one or more, desirably two or more flame retardants, and preferably three or more different types of flame retardants, including at least one halogenated flame retardant compound. Flame retardants are those that can be added to the compositions of the invention including the polyolefin and the styrenic block copolymer to render the composition less likely to ignite and if they are ignited, to burn less efficiently, or reduce the vertical burn rate of such compositions.

Examples of flame retardant compounds suitable for use in the present invention include, but are not limited to, halogenated compounds such as chlorinated paraffins; chlorinated alkyl phosphates; aliphatic brominated compounds; aromatic brominated compounds such as brominated diphenyloxides, brominated diphenylethers such as decabromodiphenyl oxide, and brominated diphenylethane; brominated epoxy polymers and oligomers; red phosphorus; halogenated phosphorus; phosphazenes; aryl/alkyl phosphates and phosphonates; phosphorus-containing organics such as phosphate esters, phosphorus-containing amines, phosphorus-containing polyols; metal oxides such as antimony trioxide and antimony oxide; zinc-based compounds such as zinc sulfide, zinc stannate, zinc oxide and zinc borate; metal nitrates; organic metal complexes and low melting glasses.

In a preferred embodiment, at least one flame retardant present is a halogenated compound, desirably an aromatic brominated compound, preferably a brominated diphenylethane such as ethane-1,2,bis(pentabromophenyl) (i.e., decabromodiphenylethylene) or a brominated diphenyl oxide or diphenyl ether, such as decabromodiphenyl oxide or a combination thereof. The halogenated flame retardant compounds are present in an amount generally from about 10 to about 250 parts, desirably from about 15 to about 150 parts, and preferably from about 20 to about 130 parts, based on 100 parts total weight of the polyolefin, styrenic block copolymer, and softener present in the composition.

The compositions of the present invention also preferably include a flame retardant co-agent in addition to the halogenated compound. One preferred co-agent is a metal oxide such as antimony trioxide or antimony oxide. The metal oxide is present in an amount generally from about 5 to about 100 parts, desirably from about 8 to about 80 parts, and preferably about 10 to about 60 parts by weight per 100 parts by weight of the halogenated flame retardant compound.

The compositions of the present invention further preferably include at least one zinc-based compound such as zinc borate or zinc oxide, preferably zinc borate in an amount generally from about 5 to about 100 parts, desirably from about 8 to about 80 parts, and preferably about 10 to about 60 parts by weight per 100 parts by weight of the halogenated flame retardant compound.

In a highly preferred embodiment, three or more flame retardants are present and include at least an aromatic bromated compound, a metal oxide, and a zinc based compound, which have been found to synergistically provide desirable flame retardant properties to compositions including a styrenic block copolymer, polyolefin and softener. In a further preferred embodiment, the compositions include decabromodiphenyl oxide, zinc borate and antimony oxide. Other flame retardant compounds can be present in the compositions of the present invention in various amounts.

Nanoparticulates

The compositions of the present invention include at least one nanoparticulate such as, but not limited to, an organically modified clay or organoclay; a carbon nanotube; or unmodified nanoclays.

Nanoparticulates that may be utilized in one embodiment of the present invention generally have a particle size from about 1 to 10,000 nanometers and desirably from about 100 to about 1,000 nanometers. In a preferred embodiment, it is desirable to use an organically modified clay, or a nanoclay which can form a nanocomposite with the polyolefin and styrenic block copolymer. The organically modified clays are generally prepared by reacting a clay with an organic cation or cations provided by specific quaternary ammonium compounds.

In one embodiment, unmodified nanoclays are utilized in compositions of the present invention. Unmodified nanoclays are generally smectite clays, with mont-morillonite clay being the most common member of the smectite clays. Further included in the composition with the untreated nanoclays are one or more intercalating additives, such as water, or a component that has strong hydrogen bonding. In such cases, the intercalating additive becomes intercalated between the layers of the clay. The nanoclays are preferably exfoliated when processed, such as utilizing extrusion, with intercalating additives. For example, in one embodiment a nanoclay and water as an intercalating additive are added to a composition of the present invention and extruded. When the temperature of the process exceeds the boiling point of the intercalating additive, such as water, the intercalating additive can be driven off, such as in the form of steam, when the composition exits the extruder or a vent thereof. In one embodiment the nanoclay and intercalating additive are preferably pre-mixed before being added to the remainder of a flame retardant composition prior to processing.

The clays which are organically modified are more easily dispersed in the polymer matrix and can form a nanocomposite such as intercalated or exfoliated structures. It is preferable to utilize a clay with an exfoliatable structure. Intercalated nanocomposites have polymer chains which are intercalated between the silicate layers of the clay resulting in a well ordered multilayer, where the layers of the clay retain their structural registry. Exfoliated nanocomposites are those in which the silicate clay layers or platelets having thickness on a nanometer scale, are exfoliated or substantially separated, i.e. mechanically, by shear mixing, and are randomly and highly dispersed throughout the continuous polymer matrix. It is also possible that the nanocomposites can be a mixture having both intercalated and exfoliated structures. It is believed the organically modified clays increase the effectiveness of the flame retardants by increasing the low shear viscosity substantially to prevent dripping from happening, and to increase the barrier property to slow down the diffusion of decomposed volatiles to the gas phase for burning. For the compositions disclosed in this invention, the nanoclays also contribute to high char formation of the compositions upon burning, and also a reduction of peak heat release during burning as evidence by the burning using a Cone calorimeter.

In order to obtain better compatibility between the polyolefin and organoclay, it is desirable that the organoclay contains organic groups optionally substituted which increase compatibility of the clay with the polyolefin. In one preferred embodiment, the organoclay contains substituted alkyl side chains.

The types of clay minerals which can be utilized include, but are not limited to, smectite, vermiculite, halloysite, or any synthetic analogs or combinations thereof, with smectite-type clay being preferred. Smectite-type clays which are useful in preparing the required organoclays include montmorillonite, hectorite, bentonite, beidellite, stevensite, saponite, nontronite, sauconite, sobokite, svinfordite, and the like.

In one embodiment, the clays used to prepare the organophilic clay of this invention are cation-exchangeable smectite clays which have the cation exchange capacity of at least 50 milliequivalents per 100 grams of clay, 100 percent active basis (i.e. beneficiated and essentially free of non-clay impurities). Smectite-type clays are well known in science, geology and in the art of rheological additives, and are commercially available from a variety of sources both in the United States and throughout the world. They are unique among clays in that they exhibit the phenomena of swelling to many times their size when contacted with water.

The organic cations which can be reacted with a clay to form the organically modified clay utilized in the present invention can be selected from a variety of nitrogen-based quaternary materials that are capable of exchanging cations with the selected smectite-type clay. The organic cations which are reacted with the smectite-type clay to prepare the inventive organophilic clays have a positive charge localized on a single nitrogen atom within the compound.

In one embodiment of the invention, the organic cation is provided by quaternary ammonium compounds. Particularly useful are quaternary ammonium compounds which include those having the formula:

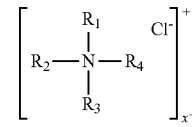

wherein $R_1$ comprises a group selected from (i) linear or branched aliphatic, aralkyl, or aromatic hydrocarbon groups having from 8 to 30 carbon atoms or (ii) alkyl or alkyl-ester groups having 8 to 30 carbon atoms; $R_2$, $R_3$, and $R_4$ are independently (a) linear or branched aliphatic hydrocarbon, fluorocarbon, or other halocarbon groups having from 1 to about 30 carbon atoms; (b) aralkyl or aromatic groups having from 6 to about 30 carbon atoms, (c) alkoxylated groups containing from 1 to about 80 moles of alkylene oxide; (d)

amide groups, (e) oxazolidine groups, (f) allyl, vinyl, or other alkenyl or alkynyl groups possessing reactive unsaturation and having from 2 to about 30 carbon atoms, or (g) hydrogen; and X' comprises an anion selected from the group consisting of chloride, methyl sulfate, acetate, iodide, and bromide, preferably chloride. For purposes of this invention, quaternary phosphonium and sulfonium based salts are defined as within the definition of quaternary ammonium compound.

The raw materials used to make the quaternary ammonium compounds can be derived from natural oils such as tallow, soya, coconut and palm oil. Useful aliphatic groups in the above formula may be derived from other naturally occurring oils including various vegetable oils, such as corn oil, coconut oil, soybean oil, cottonseed oil, castor oil and the like, as well as various animal oils or fats. The aliphatic groups may likewise be petrochemically derived from, for example, alpha-olefins. Representative examples of useful branched, saturated radicals included 12-methylstearyl and 12-ethylstearyl.

Examples of useful aromatic groups include benzyl and benzylic-type materials derived from benzyl halides, benzhydryl halides, trityl halides, halophenylalkanes wherein the alkyl chain has from 1 to 30 carbon atoms, such as 1-halo-1-phenyloctadecane; substituted benzyl moieties, such as those derived from ortho-, meta-, and para-chlorobenzyl halides, para-methoxybenzyl halides, ortho-, meta-, and para-nitrilobenzyl halides, and ortho-, meta-, and para-alkylbenzyl halides wherein the alkyl chain contains from 1 to 30 carbon atoms; and fused ring benzyl-type moieties, such as those derived from 2-halomethylnaphthalene, 9-halomethylanthracene, and 9-halomethylphenanthrene, wherein the halo group comprises chloro, bromo, or any other such group which serves as a leaving group in the nucleophilic attack of the benzyl type moiety by a nitrogen atom to generate a substituted amine.

Examples of other aromatic groups include aromatic-type substituents such as phenyl and substituted phenyl; N-alkyl and N,N-dialkyl anilines, where the alkyl groups contain between 1 and 30 carbon atoms; ortho-, meta-, and para-nitrophenyl, ortho-, meta-, and para-alkyl phenyl, wherein the alkyl group contains between 1 and 30 carbon atoms; 2-, 3-, and 4-halophenyl wherein the halo group is defined as chloro, bromo, or iodo; and 2-, 3-, and 4-carboxyphenyl and esters thereof, where the alcohol of the ester is derived from an alkyl alcohol, wherein the alkyl group contains between 1 and 30 carbon atoms, aryl such as phenol, or aralkyl such as benzyl alcohols; and fused ring aryl moieties such as naphthalene, anthracene, and phenanthrene.

Preferred quaternary ammonium compounds for purposes of the invention comprises a quaternary ammonium salt that contains at least one, preferably two or three, hydrocarbon chains having from about 8 to about 30 carbon atoms and either no hydrophilic carbon chains or having hydrophilic radicals having a total of about 9 moles of ethylene oxide or less.

Some examples of preferred quaternary ammonium compounds to make the organoclays of this invention are: dimethyl bis[hydrogenated tallow] ammonium chloride (2M2HT), methyl benzyl bis[hydrogenated tallow] ammonium chloride (MB2HT), and methyl tris[hydrogenated tallow alkyl] chloride (M3HT).

Suitable organoclays for use in the present invention are available from Southern Clay Products, of Gonzales, Tex., as Cloisite 15A, Cloisite 20A, and SCPX-1967, from Nanocor, Inc. of Arlington Heights, Ill., trade name Nano #405, and from Rheox, Inc. (Elementis Specialties) of Hightstown, N.J., available as Benton 107, Benton 108, Benton 109. Preferred organoclays are Cloisite 15A, Cloisite 20A, Benton 108, Benton 109.

The total amount of the nanoparticulates, preferably organoclay and/or nanoclay, utilized in the compositions of the present invention, is generally from about 0.5 to about 30 parts by weight, desirably from about 1 to about 20 parts by weight, and preferably from about 1.5 to about 15 parts by weight per 100 total parts by weight of the polyolefin, styrenic block copolymer, and softener.

Additives

If desired, the compositions of the present invention may include lubricants, light stabilizers, pigments, heat stabilizers, anti fogging agents, anti-stat agents, silicone oils, anti-blocking agents, UV absorbers, anti-oxidants, processing aids, and fillers such as inorganic fillers. Examples of inorganic fillers for use in the compositions of the present invention include, but are not limited to, one or more of calcium carbonate, talc, clay that is generally not considered nanoclay, silica, titanium dioxide, carbon black, barium sulfate, mica, glass fibers, whiskers, carbon fibers, magnesium carbonate, glass powders, metal powders, kaolin, graphite, and molybdenum disulfide. The optional components, independently, can be utilized within ranges not adversely affecting the performance of the compositions and are generally about 50 parts by weight or less per 100 parts by weight of the polyolefin, styrenic block copolymer and softener.

The compositions of the present invention may also optionally include other polymers such as vinyl acetates, for example ethylene vinyl acetate, in an amount generally up to about 10 parts by weight per 100 parts by weight of the polyolefin, styrenic block copolymer, and softener. The optional polymers are generally utilized to improve processability.

Depending upon the needs of the end user with respect to material properties, compositions of the present invention can be formulated or specifically tailored to possess such desirable characteristics. In a preferred embodiment, as described herein, compositions are formulated to pass the UL 94 V-O vertical burn test. For example, in an embodiment where it is desirable to have a short flame-out time, it is desirable to utilize relatively higher amounts of flame retardant compounds, while a relatively lower amount of nanoparticulate can be utilized, such as at the lower end of the disclosed ranges. In one embodiment from about 0.5 to about 10 parts by weight of the nanoparticulate per 100 parts by weight of the polyolefin, styrenic block copolymer and softener is utilized. In the embodiment, three or more flame retardants are utilized including a halogenated compound, metal oxide and zinc-containing compound. The halogenated compound, such as decabromodiphenyl oxide, is utilized in an amount from about 30 to about 210 parts per 100 parts by weight of the polyolefin, styrenic block copolymer and softener, the metal oxide and zinc-containing compound are each utilized in an amount from about 20 to about 100 parts by weight of the halogenated flame retardant.

In additional embodiments, it is desirable to utilize relatively greater amounts of nanoparticulates such as the nanoclay or organically modified clay in order to promote reinforcement within the compositions which has been found to aid in passing the UL 94 V-O vertical burn test. In such embodiments, it has been unexpectedly found that the amounts of flame retardants can be decreased while still maintaining flame retardant properties of the composition. For example, in some embodiments the nanoclay and/or organoclay is present in a total amount of from about 10 to about 30 parts per 100 parts by weight of the polyolefin, styrenic block copolymer and softener. The halogenated flame retardant is present in an amount from about 10 to about 30 parts per 100 parts by weight of the polyolefin, styrenic block copolymer and softener, the metal oxide and zinc-containing compound are each present in an amount from 5 to about 100 parts by weight of the halogenated flame retardant.

Methods of Preparation

In one embodiment, the compositions of the present invention are formed by blending the desired components in one or more steps, preferably by mixing, heating the components of the composition to obtain a melted composition without substantially degrading the components thereof, and mixing the melted composition, preferably to substantially disperse the components thereof. Melt blending is performed at a temperature generally from about 190° C. to about 210° C. and preferably from about 190° C. to about 200° C. Compositions of the present invention can be prepared in a Banbury, two roll mill, a continuous mixer such as single screw or twin screw extruder, a kneader or any other mixing machine as known to those of ordinary skill in the art. After preparation of the compositions, they can be pelletized or diced utilizing appropriate equipment, if desired. Mixing time can vary, but is generally from about 3 to about 7 minutes, desirably from about 4 to about 6 minutes, and preferably from about 5 to about 6 minutes. As indicated hereinabove, when the nanoparticulate utilized is an unmodified nanoclay, such as a natural clay, an intercalating additive is preferably included in the composition. In one embodiment, the nanoclay and an effective amount of intercalating additive can be pre-mixed prior to being added to the other components of the composition before melt mixing or blending.

The compositions of the present invention including a polyolefin, styrenic block copolymer, softener and a synergestic combination of at least one halogenated flame retardant and a nanoparticulate such as an organically modified clay provides desirable flame retardant thermoplastic elastomers, which are thermoplastics and can be molded and remolded as desired. The compositions exhibit desirable vertical burn characteristics. Moreover, when burned using Cone calorimeter at 50 kw/m² radiant heat flux, the compositions produce large amounts of charred material that is believed to lessen the dripping in the UL 94 V-0 vertical burn test. Advantageously, various embodiments of the present invention are capable of passing the UL 94 V-0 vertical burn test. The UL 94 V-0 test determines a material's tendency to either extinguish or to spread a flame once the material has been ignited. UL ratings relate to a material's behavior when introduced to a flame source. For a rating of 94 V-0, a material must be self-extinguishing and must not drip or run while burning. In the test, a sample of the material is held over a Bunsen burner, ignited, and allowed to burn. When the flame is removed from the sample, the fire must go out within 10 seconds, and the material must not have dripped from the burning sample. If the material continues to burn or if it drips and runs, it cannot be related 94 V-0. The UL 94 V-0 vertical burn test is herein incorporated by reference. Moreover, the compositions exhibit good tensile properties, such as tensile strength greater than 1200 psi and elongation greater than 200%. The compositions also have low or preferably no deformation under stress such as measured by UL 62 at 150° C. The compositions exhibit low peak heat release and good char formation upon burning using Cone calorimeter.

Molded articles obtained by molding the compositions of the present invention can be used in various applications such as electrical or electronic components, automotive, extrusions and co-extrusions, building and construction, appliances, electrical, industrial, medical and industrial applications, but not limited thereto. For example, the molded articles can be used in electronic parts or connectors, wires, cables, coil cords, especially jacketing, instrumental panels, center panels, center console boxes, silencer gears, and other articles.

EXAMPLES

The present invention is illustrated in further detail with respect to the examples set forth herein, which are not intended to limit the scope of the invention. Control and Example formulations were prepared as follows. Components of each respective composition were added to a Banbury and melt mixed at a temperature of about 190° C. to about 200° C. for about five minutes in order to disperse and mix the component before being removed from the Banbury. Test samples were prepared from the mixed composition independently by injection molding at 200° C., compression molding at 180° C. for three minutes, and by extrusion at a temperature of about 180° C. to about 210° C.

TABLE I

| Component | Control 1 | Example 1 | Example 2 | Example 3 |
|---|---|---|---|---|
| Styrenic Block Copolymer[1] | 100 | 100 | 100 | 100 |
| Polyolefin[2] | 130 | 130 | 130 | 130 |
| Zinc-based Compound[3] | 30 | 30 | 30 | 15 |
| Metal Oxide[4] | 30 | 30 | 30 | 15 |
| Halogenated Flame Retardant[5] | 102 | 102 | 60 | 102 |
| Organically Modified Clay[6] | 0.0 | 40 | 40 | 40 |
| Softener[7] | 116 | 116 | 70 | 116 |
| Stabilizer (EPON 1002F) | 1 | 1 | 1 | 1 |
| Stabilizer (DLTDP) | 1 | 1 | 1 | 1 |
| Stabilizer (Irganox 1010) | 0.3 | 0.3 | 0.3 | 0.3 |
| Stabilizer (Irganox 1024M) | 0.5 | 0.5 | 0.5 | 0.5 |
| TOTAL WEIGHT (Parts) | 510.8 | 550.8 | 462.8 | 520.8 |
| UL 94 V-O Vertical Burn Test | Fail | Pass | Pass | Pass |
| Tensile Strength, psi (ASTM 412) | 2300 | 1900 | 2180 | 1890 |
| Elongation to break, % (ASTM 412) | 640 | 620 | 530 | 580 |

[1]Kraton G-1651 from Kraton Polymers
[2]Polypropylene
[3]Zinc Borate
[4]Antimony Oxide
[5]Decabromodiphenyl Oxide
[6]CLOISITE ® 20A from Southern Clay Products
[7]Semtol 500 from Crompton Corp.

TABLE II

| Component | Example 4 | Example 5 | Example 6 | Example 7 |
|---|---|---|---|---|
| Styrenic Block Copolymer[1] | 100 | 100 | 100 | 100 |
| Polyolefin[2] | 130 | 130 | 130 | 130 |
| Zinc-based Compound[3] | 15 | 30 | 15 | 30 |
| Metal Oxide[4] | 15 | 15 | 30 | 30 |
| Halogenated Flame Retardant[5] | 60 | 102 | 102 | 102 |
| Organically Modified Clay[6] | 40 | 40 | 40 | 5 |
| Softener[7] | 70 | 70 | 70 | 70 |
| Stabilizer (EPON 1002F) | 1 | 1 | 1 | 1 |
| Stabilizer (DLTDP) | 1 | 1 | 1 | 1 |
| Stabilizer (Irganox 1010) | 0.3 | 0.3 | 0.3 | 0.3 |
| Stabilizer (Irganox 1024M) | 0.5 | 0.5 | 0.5 | 0.5 |
| TOTAL WEIGHT (Parts) | 432.8 | 489.8 | 489.8 | 469.8 |
| UL 94 V-O Vertical Burn Test | Pass | Pass | Pass | Pass |

TABLE II-continued

| Component | Example 4 | Example 5 | Example 6 | Example 7 |
|---|---|---|---|---|
| Tensile Strength, psi (ASTM 412) | 2360 | 2098 | 2066 | 2855 |
| Elongation to break, % (ASTM 412) | 576 | 532 | 521 | 622 |

[1]Kraton G-1651 from Kraton Polymers
[2]Polypropylene
[3]Zinc Borate
[4]Antimony Oxide
[5]Decabromodiphenyl Oxide
[6]CLOISITE ® 20A from Southern Clay Products
[7]Semtol 500 from Crompton Corp.

As set forth above, the example compositions of the present invention exhibit synergistic results by the inclusion of one or more flame retardants including a halogenated flame retardant and an organically modified clay. Example 1 shows that a nanoparticulate, organically modified clay can be utilized unexpectedly to impart additional flame retardant properties to a composition which includes flame retardants, but does not pass the UL 94 V-O vertical burn test.

The example compositions, including effective amounts of a zinc-based compound, metal oxide, halogenated flame retardant, and nanoclays advantageously passed the UL 94 V-O vertical burn test and are suitable for use, especially in electronic parts as well as in wire and cable jacketing.

In accordance with the patent statutes, the best mode and preferred embodiment have been set forth; the scope of the invention is not limited thereto, but rather by the scope of the attached claims.

What is claimed is:

1. A flame retardant composition, comprising:
a styrenic block copolymer, wherein the styrenic block copolymer has at least one hard polymer block derived from at least an aromatic vinyl compound unit, and has at least one soft polymer block, wherein the soft polymer block includes at least one repeat unit derived from an olefin or a diene;
a polyolefin polymer or copolymer in an amount from about 30 to about 210 parts based on 100 parts by weight of the styrenic block copolymer, wherein the polyolefin copolymer is a) a greater part by weight of one or more olefin monomers and a lesser amount of one or more non-olefin monomers or b) two or more different olefin monomers;
a softener in an amount from about 10 to about 250 parts by weight per 100 parts by weight of the styrenic block copolymer;
two or more flame retardants, including a halogenated flame retardant in an amount from about 10 to about 250 parts based on 100 total parts by weight of the polyolefin polymer or copolymer, styrenic block copolymer and softener; and
a nanoparticulate comprising one or more of an organically modified clay and a nanoclay in an amount from about 0.5 to about 30 parts, based on 100 total parts by weight of the polyolefin polymer or copolymer, styrenic block copolymer and softener.

2. The composition according to claim 1, wherein a metal oxide flame retardant is present in an amount from about 5 to about 100 parts based on 100 parts by weight of the halogenated flame retardant, and wherein the halogenated flame retardant is an aromatic brominated compound.

3. The composition according to claim 2, wherein a zinc-based flame retardant compound is present in an amount from about 5 to about 100 parts based on 100 parts by weight of the halogenated flame retardant.

4. The composition according to claim 2, wherein the aromatic brominated compound includes decabromodiphenyl oxide or decabromodiphenylethylene, or a combination thereof, wherein the metal oxide includes antimony trioxide or antimony oxide, or a combination thereof, and wherein the zinc-based compound is zinc borate.

5. The composition according to claim 2, wherein the aromatic brominated compound is present in an amount from about 15 to about 150 parts based on 100 parts total weight of the polyolefin, styrenic block copolymer, and softener, wherein the metal oxide is present in an amount from about 8 to about 80 parts by weight per 100 parts by weight of the aromatic brominated compound, and wherein the zinc-based compound is present in an amount from about 8 to about 80 parts by weight of the aromatic brominated compound.

6. The composition according to claim 5, wherein the aromatic brominated compound is present in an amount from about 20 to about 130 parts based on 100 parts total weight of the polyolefin, styrenic block copolymer, and softener, wherein the metal oxide is present in an amount from about 10 to about 60 parts by weight per 100 parts by weight of the aromatic brominated compound, and wherein the zinc-based compound is present in an amount from about 10 to about 60 parts by weight of the aromatic brominated compound.

7. The composition according to claim 5, wherein the polyolefin polymer or copolymer includes polypropylene, and wherein the organically modified clay is present in an amount from about 1 to about 20 parts based on 100 total parts by weight of the polyolefin, styrenic block copolymer and softener.

8. The composition according to claim 7, wherein the organically modified clay is present in an amount from about 2 to about 15 parts, based on 100 total parts by weight of the polyolefin, styrenic block copolymer and softener, wherein the softener is present in an amount from about 65 to about 130 pars by weight per 100 parts by weight of the styrenic block copolymer, wherein the aromatic brominated compound is decabromodiphenyl oxide or decabromodiphenylethylene, or a combination thereof, wherein the metal oxide is antimony trioxide or antimony oxide, or a combination thereof, and wherein the zinc-based compound is zinc borate.

9. The composition according to claim 1, wherein the nanoparticulate comprises the nanoclay, and wherein the composition has also been derived from an intercalating additive.

10. The composition according to claim 5, wherein the nanoparticulate comprises the organically modified clay, wherein the nanoparticulate is present in an amount from about 1.5 to about 15 parts per 100 parts by weight of the polyolefin, styrenic block copolymer and softener.

11. The composition according to claim 3, wherein the nanoparticulate is present in an amount from about 0.5 to about 10 parts per 100 parts by weight of the polyolefin, styrenic block copolymer and softener, wherein the halogenated flame retardant is present in an amount from about 30 to about 210 parts per 100 parts by weight of the polyolefin, styrenic block copolymer and softener, wherein the metal oxide is present in an amount from about 20 to about 100 parts per 100 parts by weight of the halogenated flame retardant, and wherein the zinc-containing compound is present in an amount from about 20 to about 100 parts per 100 parts by weight of the halogenated flame retardant.

12. The composition according to claim 3, wherein the nanoparticulate is present in a amount from about 10 to about 30 parts per 100 parts by weight of the polyolefin, styrenic block copolymer and softener, wherein the halogenated flame retardant is present in an amount from about 10 to about 30 parts per 100 parts by weight of the polyolefin, styrenic block copolymer and softener, wherein the metal oxide is present in an amount from about 5 to about 100 parts per 100 parts by weight of the halogenated flame retardant, and wherein the zinc-containing compound is present in an amount from about 5 to about 100 parts per 100 parts by weight of the halogenated flame retardant.

13. A molded or extruded article formed from the composition of claim 1.

14. A molded or extruded article formed from the composition of claim 8.

15. A flame retardant composition, comprising:
   a styrenic block copolymer, wherein the styrenic block copolymer has at least one hard polymer block derived from at least an aromatic vinyl compound unit and at least one soft polymer block, wherein the soft polymer block includes at least one repeat unit derived from an olefin or a diene;
   a polyolefin polymer or copolymer in an amount from about 30 to about 210 parts based on 100 parts by weight of the styrenic block copolymer, wherein the polyolefin copolymer is a) a greater part by weight of one or more olefin monomers and a lesser amount of one or more non-olefin monomers or b) two or more different olefin monomers;
   a softener in an amount from about 10 to about 250 parts by weight per 100 parts by weight of the styrenic block copolymer;
   three or more flame retardants including (a) a halogenated flame retardant in an amount from about 10 to about 250 parts based on 100 total parts by weight of the polyolefin polymer or copolymer, styrenic block copolymer and softener, (b) a metal oxide flame retardant in an amount from about 5 to about 100 parts based on 100 parts by weight of the halogenated flame retardant, and (c) a zinc-based flame retardant compound is present in an amount from about 10 to about 30 parts based on 100 parts by weight of the halogenated flame retardant; and
   a nanoparticulate in an amount from about 0.5 to about 30 parts based on 100 total parts by weight of the styrenic block copolymer, polyolefin and softener.

16. The composition according to claim 15, wherein the nanoparticulate comprises one or more of an organically modified clay and a nanoclay.

17. The composition according to claim 16, wherein the halogenated flame retardant is an aromatic brominated compound.

18. The composition according to claim 17, wherein the aromatic brominated compound includes decabromodiphenyl oxide or decabromodiphenyl ethylene, or a combination thereof, wherein the metal oxide includes antimony trioxide or antimony oxide, or a combination thereof, and wherein the zinc-based compound is zinc borate.

19. The composition according to claim 17, wherein the brominated compound is present in an amount from about 15 to about 150 parts based on 100 parts total weight of the polyolefin, styrenic block copolymer, and softener, wherein the metal oxide is present in an amount from about 8 to about 80 parts by weight per 100 parts by weight of the halogenated flame retardant compound, and wherein the zinc-based compound is present in an amount from about 8 to about 80 parts by weight of the halogenated flame retardant compound.

20. The composition according to claim 19, wherein the brominated compound is present in an amount from about 20 to about 130 parts based on 100 parts total weight of the polyolefin, styrenic block copolymer, and softener, wherein the metal oxide is present in an amount from about 10 to about 60 parts by weight per 100 parts by weight of the halogenated flame retardant compound, and wherein the zinc-based compound is present in an amount from about 10 to about 60 parts by weight of the halogenated flame retardant compound.

21. The composition according to claim 19, wherein the polyolefin polymer or copolymer includes polypropylene, and wherein the organically modified clay is present in an amount from about 1 to about 20 parts based on 100 total parts by weight of the polyolefin, styrenic block copolymer and softener.

22. The composition according to claim 21, wherein the organically modified clay is present in an amount from about 1.5 to about 15 parts based on 100 total parts by weight of the polyolefin, styrenic block copolymer and softener, and wherein a softener is present in an amount from about 65 to about 130 parts by weight per 100 parts by weight of the styrenic block copolymer, wherein the aromatic brominated compound is decabromodiphenyl oxide or decabromodiphenylethylene, or a combination thereof, wherein the metal oxide is antimony trioxide or antimony oxide, or a combination thereof, and wherein the zinc-based compound is zinc borate.

23. The composition according to claim 1, wherein the nanoparticulate comprises the nanoclay, and wherein the composition has also been derived from an intercalating additive.

24. The composition according to claim 15, wherein the nanoparticulate comprises the organically modified clay, wherein the nanoparticulate is present in an amount from about 1.5 to about 15 parts per 100 parts by weight of the polyolefin, styrenic block copolymer and softener.

25. The composition according to claim 17, wherein the nanoparticulate is present in an amount from about 0.5 to about 10 parts per 100 parts by weight of the polyolefin, styrenic block copolymer and softener, wherein the halogenated flame retardant is present in an amount from about 30 to about 210 parts per 100 parts by weight of the polyolefin, styrenic block copolymer and softener, wherein the metal oxide is present in an amount from about 20 to about 100 parts per 100 parts by weight of the halogenated flame retardant, and wherein the zinc-containing compound is present in an amount from about 20 to about 100 parts per 100 parts by weight of the halogenated flame retardant.

26. The composition according to claim 17, wherein the nanoparticulate is present in a amount from about 10 to about 30 parts per 100 parts by weight of the polyolefin, styrenic block copolymer and softener, wherein the halogenated flame retardant is present in an amount from about 10 to about 30 parts per 100 parts by weight of the polyolefin, styrenic block copolymer and softener, wherein the metal oxide is present in an amount from about 5 to about 100 parts per 100 parts by weight of the halogenated flame retardant, and wherein the zinc-containing compound is present in an amount from about 5 to about 100 parts per 100 parts by weight of the halogenated flame retardant.

27. A molded or extruded article formed from the composition of claim 15.

28. A molded or extruded article formed from the composition of claim 22.

29. A coil cord formed from the composition of claim 1.

30. A coil cord formed from the composition of claim 15.

* * * * *